United States Patent [19]
Taguchi et al.

[11] 3,893,143
[45] July 1, 1975

[54] DEVICE FOR ADJUSTING A SHUTTER EXPOSURE TIME FOR A CAMERA

[75] Inventors: Tatsuya Taguchi, Tokyo; Yukio Iura, Yokosuka, both of Japan

[73] Assignee: Canon Kabushiki Kaisha, Tokyo, Japan

[22] Filed: Aug. 29, 1973

[21] Appl. No.: 392,451

[30] Foreign Application Priority Data
Sept. 2, 1972  Japan.............................. 47-88207

[52] U.S. Cl. ................. 354/258; 354/51; 354/239; 354/259; 354/260; 354/267
[51] Int. Cl. ............................................. G03b 9/62
[58] Field of Search........ 95/10 CT, 53 EA; 354/24, 354/50, 51, 239, 256–260, 267

[56] References Cited
UNITED STATES PATENTS
3,645,185   2/1972   Kitai ................................ 95/53 EB
3,670,636   6/1972   Holle et al. ..................... 95/53 EB X

*Primary Examiner*—Richard A. Wintercorn
*Assistant Examiner*—Russell E. Adams, Jr.
*Attorney, Agent, or Firm*—William R. Woodward

[57] ABSTRACT

A device for adjusting a shutter exposure time for a camera has a mechanical shutter mechanism and an electronic shutter mechanism. The mechanical mechanism has a speed-reduction governor operable in a medium exposure time range, which in the long exposure time range is made engageable with an operating member controlled by an electromagnet operative with a small current of the electronic shutter circuit. In the long exposure time range, the time from the start of the exposure to the release of the governor is controlled by the electronic shutter circuit.

13 Claims, 11 Drawing Figures

DEVICE FOR ADJUSTING A SHUTTER EXPOSURE TIME FOR A CAMERA

BACKGROUND OF THE INVENTION

1. Field of the Invention

This invention relates to a shutter exposure time adjusting device of the photographic camera or more particularly to a shutter exposure time adjusting device having a wide shutter opening time range.

2. Description of the Prior Art

In the shutter device applied to conventional photographic cameras, there are in common use both mechanical shutters provided with a mechanical speed adjusting mechanism and shutters in which speed adjustment is made by electronic timing circuit such as CR time constant circuit.

Generally speaking, the mechanical shutter performs fairly well the adjustment of accurate exposure time, especially in high-speed shutter time setting range. However, for low speeds, especially in adjusting range for long exposures, it is necessary to provide several stages of mechanical governors. This results in very complicated configuration and an accurate exposure time adjustment is impossible unless the mechanical governors always work smoothly. Moreover, mechanical shutters have left much to be desired with respect to durability.

On the other hand, although in electronic shutter a highly accurate adjusting operation cannot be expected in high-speed adjusting range, in the intermediate speed or long exposure adjusting range the electronic shutter is capable of adjusting the exposure time with comparatively good accuracy and, at the same time, the electronic shutter is simple in construction.

However, then trying a long exposure time with an electronic shutter, since a large current is made to flow through the holding electromagnet to hold open the shutter mechanism during exposure, the power consumption of the batteries built in the camera becomes very great and the batteries cannot withstand much repeated use. And for the speed adjusting operation, batteries which can supply normal voltage over the time of long exposure are required.

Accordingly, although the electronic shutter has advantages, it has a defect that it cannot withstand repeated use or it lacks durability unless it is used under the environmental conditions where the driving batteries operate effectively and, furthermore, unless it is used by avoiding long exposure which is its feature. This defect limits the operating range of the electronic shutter. Against these defects, the mechanical shutter, when the complicated structure is excepted, is comparatively better than the electronic shutter. However, as was described previously, establishing mechanical governors so that the shutter covers a very wide exposure time adjustment makes it impossible to be assembled into a camera especially a miniature camera where there is a space limitation.

SUMMARY OF THE INVENTION

An object of this invention is to solve at the same time all the conventional defects hitherto described.

The feature of this invention briefly stated, is to offer a shutter exposure time adjusting device in which exposure time adjustment is made by a mechanical shutter mechanism within short and medium exposure time ranges and by the joint use of an electronic shutter a mechanism and mechanical shutter mechanism within the long exposure time range.

According to this invention, the speed-reduction parts of a mechanical speed-reduction governor which performs time adjustment within the medium adjusting range of the shutter is made to engage with or disengage from an operating element which is controlled by an electromagnet which operates on a small current and which is operated by the electronic shutter circuit. The time between the shutter release and the start of the governor is adjusted by the electronic shutter circuit in the long exposure time range, the operating time of the mechanical governor being added after the operation of the electronic shutter circuit.

Since the exposure adjustment is made by the small holding current of the aforementioned electromagnet the life of the working batteries is prolonged and the range long exposure time on the long exposure side is extended. Moreover since the invented device is simple in construction, it can be assembled into miniature cameras so far as the space is concerned.

Furthermore, in the short and medium exposure time ranges, a highly accurate timing operation can be performed by the mechanical shutter mechanism. In this way, an exposure time adjusting device which covers a broad speed adjusting range can be offered.

DESCRIPTION OF THE PREFERRED EMBODIMENTS

Figure 1:
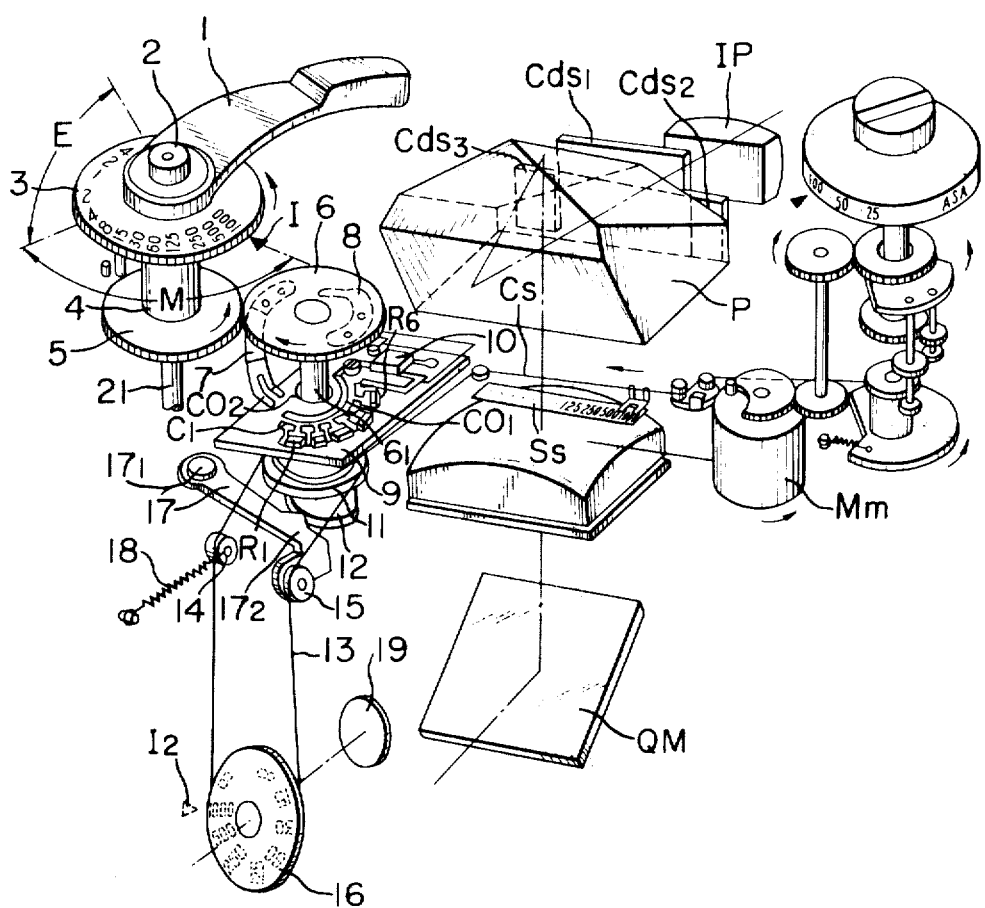
FIG. 1 shows the configuration of a camera in which the shutter time adjusting device of this is invention incorporated.

FIG. 1 shows an exposure time setting mechanism of a camera in which the shutter exposure time adjusting device according to this invention is incorporated.

In the drawing, 1 is the wind-up lever, 2 is the shutter release button installed on the same shaft as the wind-up lever is, 3 is the shutter speed setting dial fitted with play on the same shaft as the wind-up lever, 4 is the rotary shaft fixed to the dial 3, and 5 is interlocking gear.

On the dial 3, a scale is attached to indicate the shutter speed. Marks for both long exposure time the domain E (¼ seconds to 4 seconds) and for the short exposure time medium and domain together extending from ⅛ seconds to 1/1000 seconds) are inscribed on the same dial surface.

Figure 2A:
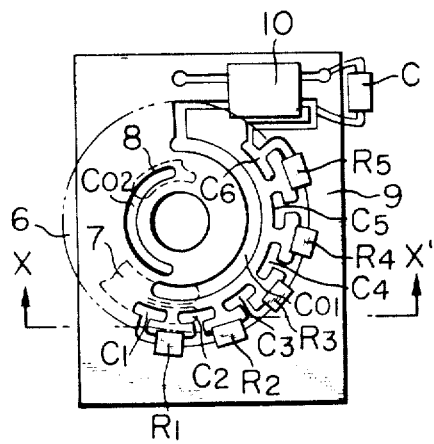
FIG. 2A and FIG. 2B are the magnified drawings of essential portions of the device shown in FIG. 1.
Figure 2B:
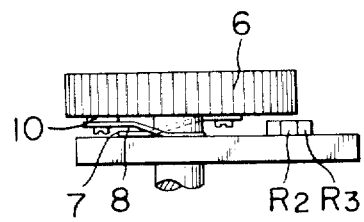

The gear 6 engages with the interlocking gear 5: $6_1$ is the rotary shaft thereof, 7 and 8 are the sliding electrodes fixed on the gear 6, and 9 is the electrode plate. The electrode plate 9 is connected to each spacing between the electrodes $C_1$ through $C_6$ to which the pellet type resistors $R_1$ through $R_5$ are print wired as shown in detail in FIGS. 2A and 2B. Opposite to the electrodes $C_1$ through $C_6$ a common electrode $C_O$ is provided on the electrode branch 9 and, crossing over the electrode $C_{O1}$ and on the back of the gear 6, the electrode sliding arm 7 is isolated by way of the insulating plate 10 (FIG. 2B). An arcuate electrode $C_{O2}$ is print-installed on the electrode plate concentrically with the rotary shaft $6_1$, and the sliding arm 8 slides on said electrode.

The individual electrodes $C_1$ throgh $C_6$, $C_{O1}$, and $C_{O2}$ are distributed over 180° around the rotary shaft $6_1$ on the electrode plate 9, and the sliding arms 7 and 8 are moved on the electrodes, sliding, until the shutter speed in the E range on the scale of dial 3 is aligned to the fixed index mark. The chip 10 providing the electronic shutter IC circuit is fixed on the electrode plate 9. The electrode $C_{O1}$ and the sliding arm 8 forms the power switch SM which will be described later.

In FIG. 1, the rotary shaft $6_1$ has the pulley 11 and cam plate 12 in one unit on the same shaft and, with the rotation of the adjusting dial 3, the pulley 11 and cam plate 12 are rotated in one unit. The connecting chain 13 is suspended on the guide pulleys 14 and 15, speed adjusting pulley 16, and the pulley 11. The selector lever 17 has its one end $17_1$ made to make contact on the fixed frame of the camera oscillatably and its center $17_2$ pressed to the cam plate 12. The hub of the pulley 14 is spring tensioned in the direction to tension the chain 13 by the force of the spring 18.

The selector lever 17 tensions the chain 13 which then transmits the drive force of the pulley 11 to the pulley 16 and establishes driving coupling by the cam plate 12 only when the index mark within the adjusting range M of the dial 3 is aligned with the index I. However, the cam form of the cam plate 12 is so determined as to release this driving coupling when the index mark within the adjusting range E of the dial 3 is aligned with the index I.

Figure 3A:
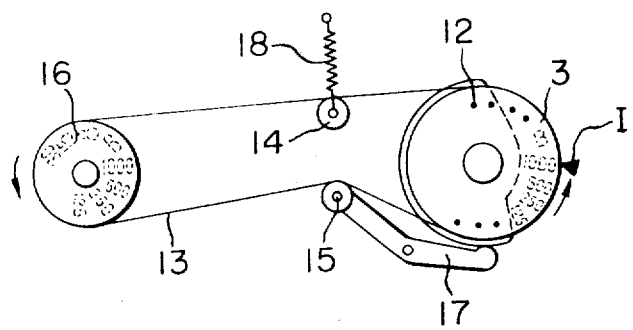
FIG. 3A and FIG. 3B are diagrams for describing the principle of the operation of certain essential portions of the device shown in FIG. 1.
Figure 3B:
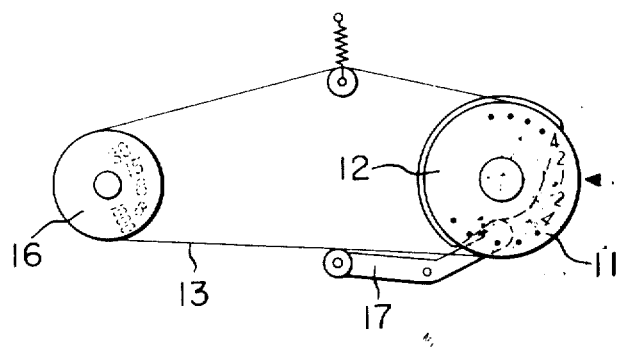

Such constructions are illustrated in sketch form in FIG. 3A and FIG. 3B.

FIGS. 3A and 3B show the principle of the construction shown in FIG. 1 to simplify description although in FIGS. 3A and 3B the construction of the selector lever 17 and the relationship between the pulley 11 and the dial 3 and cam plate are different from the construction shown in FIG. 1 in that both are provided on the same shaft. In FIG. 3A, when setting the dial 3 to 1/1000 second which has within the M/range, the lever 17 tensions the chain 13 against the force of the spring 18 so as to establish driving coupling between the pulley 16 and pulley 11. As a result, the position of the pulley 16 is adjusted to a predetermined position interlocking with the adjusting operation of dial 3.

On the other hand as in FIG. 3B, when the dial 3 is set to 1 second which lies within the E/range, the selector lever 17 releases the tension of the chain 13 by means of the cam plate and, since the driving coupling between the pulley 11 and pulley 16 is released in the adjusting range E, the position of the pulley 16 receives no influence from the operation of the dial 3 in the adjusting range E.

Accordingly the pulley 16 is displaced interlocking with the adjusting operation of the dial 3, especially the adjusting operation in M/range, until the numerical value shown in the dotted line in FIG. 1 matches the index $I_2$, and, in the E/range, holds itself displaced at the position which corresponds to one-eighth second, independent of the operation of the dial 3.

The pulley 16 is coupled to displace the time adjusting cam 19 of the shutter mechanism which will be described later. A portion of cam 19 and the shutter mechanism are shown in detail in FIG. 4.

Figure 4:
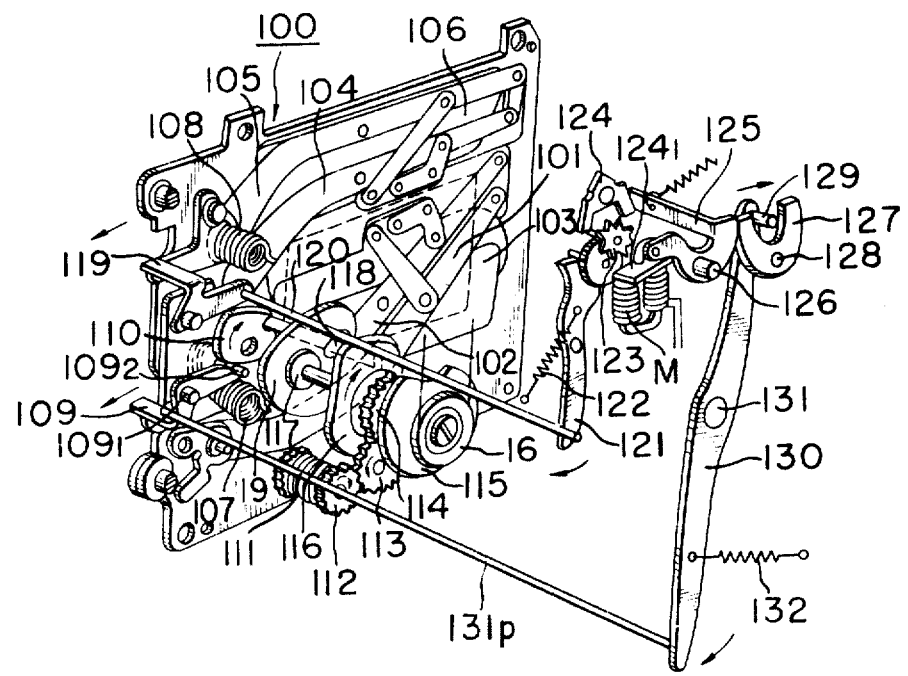
FIG. 4 shows the construction of the shutter mechanism of the shutter time adjusting device of the invention incorporated in the camera shown in FIG. 1.

In FIG. 4, 100 is the well known Copal Square S shutter (A product name: refer to the monthly magazine "Photo-Industry" Apr. 1966, pp. 40–46) whose first screen and second screen of the shutter are made of thin metal plates, and 101 and 102 are the first screen arms which hold the first screen plate 103 by a link mechanism, and 104 and 105 are the second screen arms which hold the second screen plate 106 by a link mechanism. The first screen arms 101 and 102 are driven downwardly by the coil spring 107 to open the shutter first screen plate at time of shutter release. On the other hand, the second screen arms 104 and 105, drive the shutter second screen downwardly by the coil spring 108 at time of closing the shutter to perform the shutter closing operation. The shutter first screen arm releasing element 109 is supported by the shaft $109_1$ and the pins planted on said element 109 are made to slidably contact to the release cam 110. The coil spring 111 is tensioned by a mechanism not shown in the drawing at time of winding up the shutter, and 112 and 113 are gears used to transmit the driving power of the spring 111.

Although the pulley 16 shown in FIG. 1 is provided with a driven gear 114, which engages with the gear 113, the control cams 115 and 116, and the governor cam 117 on the same shaft, since the cams 115 and 116 are not related directly to this invention, their details are omitted. The cam 117 is supported freely slidably and is rotated by the long hole which fits to the pin 118 planted in an eccentric position on the cam 116 which rotates in a unit at time of shutter release. The tip of the pin 118 fits to the fork portion of the release cam 110.

The second screen release lever 119 is pivoted on the base plate and is freely oscillatable. One end of said lever 119 is made to engage with the rear end of the second screen arm 105 and the other end has a pin 120 planted on it, and said pin is made to face the circumference of the cam 19. The sector lever 121 of the mechanical governor mechanism is, by the expanding force of the compressed spring 122, energized to rotate clockwise and one end of it is pressed to engage with the pin 120. Elements 123 and 124 show the escape wheel and anchor of the governor. The anchor 124 is controlled by one end of the attracted body 125 of the electromagnet M, and the armature structure 125 is held freely oscillatable the shaft 126.

The U lever 127 is supported freely on the shaft 128. The pin 128 which engages with said lever is planted on the release interlocking lever 130. The interlocking lever 130 is supported by the shaft 131, freely oscillatable, and on its one end the pin 131P, which engages with one end of the release lever 109, is planted. 132 is the return spring for the lever 130.

In the shutter mechanism shown in FIG. 4, the cam 117 displaces and the space between the pin 120 and cam 19 is adjusted to various lengths when the aforementioned shutter adjusting dial 3 is adjusted to the high-speed adjusting range M.

At the same time, the sector lever 121 is moved to a position lying outside the range of swing of the pin 120 by a mechanism not shown in the drawing.

On the other hand, when the shutter adjusting dial is adjusted to E/range, the cam 19 is held at a position where the interval between it and the pin 120 is at maximum.

When the drive gear 112 is released, by way of the mechanism not shown in the drawing, by the raising of the finder mirror QM shown in FIG. 1 at time of shutter release, and starts rotation by the drive force of the coil spring 111, the control cam 116 is rotated by way of the gears 113 and 114. As a result, the pin 118 on the cam 116 rotates the cam 116 and the cam 110 simultaneously and the cam 110 rotates the lever 109 clockwise by way of the sliding pin $109_2$ to release the first screen arm 102 and, by rotating the first screen plate 103 downward, releases the shutter. In the case the dial 3 is adjusted to M/range, the pin 120 is kicked by the cam plate 117 to drive the lever 119 counterclockwise to release the second screen arm 105 and to perform the shutter closing operation. However, when the dial 3 is adjusted to the E/range, the arm 130 swings clockwise interlocking to the 1st screen release lever 109 to rock the U lever 127 clockwise. Due to the rocking of the U lever 127, the anchor arm 124 tries to move in the direction to departing from the escape wheel by the force of the spring 124, but since the armature 125 of the electromagnet M holds the arm 124 by the electromagnet M against the spring $124_1$, the rotation of the cam 19 is stopped by way of the sector arm 121 and pin 120, and the shutter is held in open state. When the electromagnet M is deactivated by the completion of the timing operation of the electronic shutter described later, the armature 125 is released, the anchor arm is separated from the escape wheel, the timing operation of the mechanical governor is started, and the sector lever 121 is gradually allow clockwise to rotate the cam 19 to rotate by the force of the spring 111 by way of the pin 120. As a result, the second screen release lever 119 swings counterclockwise along the cam surface of the cam 19 and, by releasing the second screen plate by the lever 119, closes the shutter.

Accordingly, in the shutter 100 shown in FIG. 4, a timing operation by mechanical governor is performed which is in addition to the electronic shutter time.

Figure 5:
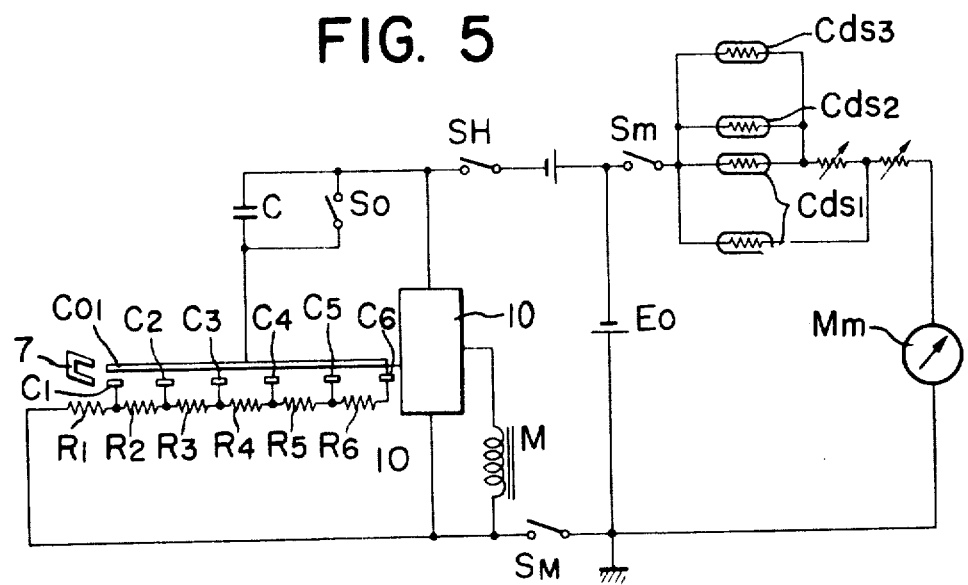
FIG. 5 is a diagram of the electric circuit of the configuration shown in FIG. 4.

FIG. 5 shows the circuit of the electronic shutter of the camera shown in FIG. 1 and FIG. 4. In FIG. 5, $R_1$ through $R_5$ are the pellet type resistors shown in FIG. 2, C is the timing condenser, SM is the power supply switch for electronic shutter circuit consisting of the aforementioned sliding arm and the electrode $Co_2$, and switch So interlocks with the release lever 109 shown in FIG. 4 and is a switch that changes over from normal ON state to OFF state when the 1st screen plate starts the opening operation and changes over to ON state again when the shutter is wound up. Eo is the power supply for the electronic shutter and exposure meter, SH is the hold switch and Sm is the power supply switch for the exposure meter circuit, $CdS_1$, $CdS_2$, and $CdS_3$ are the photoconductive light measuring elements installed at the eye piece of the pentagonal prism of FIG. 1, and Mm is the exposure meter.

Since the switch SM is closed only when the shutter adjusting dial 3 is adjusted to the E/range for relatively long exposure time, SM is left open when the shutter adjusting dial is adjusted to short exposure time which the shutter speed is adjusted mechanically and the electronic shutter circuit 10 is left inoperative.

As the shutter integrated circuit 10, a well-known circuit such as Schmidt circuit is used. However since, it is sufficient for the circuit to generate a weak operating force on the magnet M to engage or disengage the anchor arm, which is the final stage of the mechanical governor, a rather small capacity switching circuit is employed.

Figure 6:
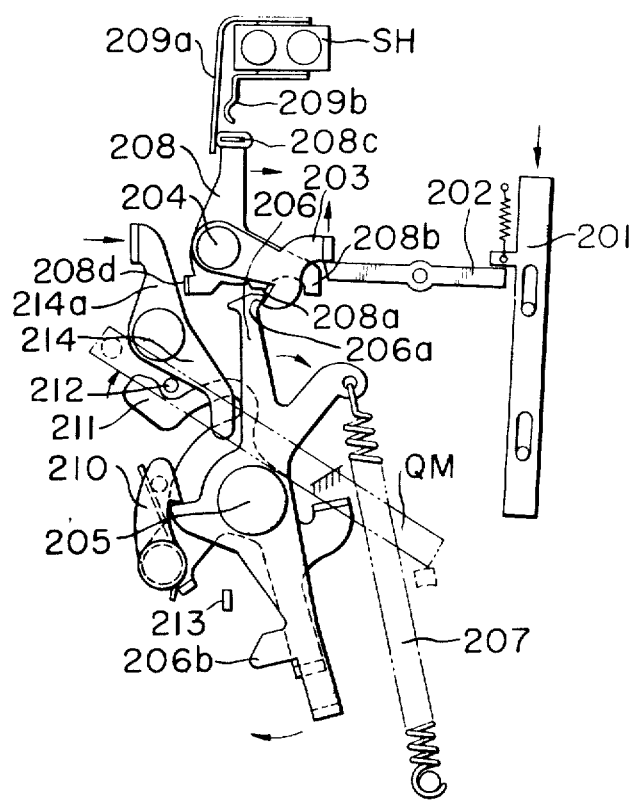
FIG. 6 shows the configuration of certain essential portions of the camera and device shown in FIG. 1.

The hold switch SH is constructed as shown in FIG. 6. In FIG. 6, 201 is the release lever which interlocks to the release button shaft 21, 202 is the interlocking lever, 203 is the retaining element of the reflecting mirror QM, 204 is the shaft supporting the retaining element 203, 206 is the mirror drive lever freely supported on the shaft 204, 207 is the drive spring attached to the drive lever 206, 208 is the switch change-over lever supported on the same shaft as the retaining element 203, 208a and 208b are the bent out section installed on the lower edge of the lever 208, 208c is the upper end bending section of the lever 208 which is covered with insulating film.

The electrode 209a engages with the bending section 208c of the lever 208 and which forms the moving contact of the switch SM, and 209b is the opposite electrode.

The retaining element 210 engages with the drive lever 206, and 211 is the mirror drive lever which is supported on the drive lever 206 and the main shaft 205. Since the relationship between the drive levers 206 and 211 and the retaining lever 210 show the well-known mechanism used in the mirror drive mechanism of single lens reflex cameras, its detailed description is omitted. Since the upper tip 206a of the drive lever 206 hits the bent out section 208a of the selector lever 208 and accordingly the clocwise rotation of the switch contact piece 209 is inhibited, the switch SH is held in open state.

Interlocking with the depression of the release button 2 of FIG. 1, the release lever 201 of FIG. 6 goes downwardly and, when the engagement of the retaining lever 203 with the engaging section 206a of the drive lever 206 is released, the release lever 206 is driven in clockwise direction by the force of the spring 207, the selector lever 208 is rotated clockwise by the force of the contact piece 209a, and the contact piece 209b is touched. Therefore the switch SH is closed. At the same time the release button is depressed, the tip 206a of drive lever 206 is rotated going past the bent out sections 208a and 208b. Therefore, the selector lever 208, although the interlock lever 202 is restored immediately after the depression of the release button, is held in a state that permits the switch 209a,b to remain closed.

The lever 211 is driven together with the lever 206 and, when the mirror QM goes up by way of the pin 212 on the mirror, one end 206b of the lever 206 trips the retaining of the drive gear 112 shown in FIG. 4 and releases the shutter. After the shutter has completed exposure, one end of the lever 214 is pressed in the direction of arrow by the signal for closing the second screen plate to release the engagement between the retaining element 210 and the drive lever 206. Therefore, only the lever 211 is rotated counterclockwise by the spring force not shown in the drawing, and the mirror QM is restored to its original state.

On the other hand, since the drive lever 206 is immediately rotated clockwise by the spring force 207, the selector lever 208 holds the switch SH in closed state and the switch SH opens again when, in interlocking with the next shutter winding-up motion, the drive levers 206 and 211 finishes its motion against the spring 207, and the bottom edges 208a and 208b of the selector lever 208 are pushed up. Accordingly, the hold switch SH is put in its closed state only by the depression of the shutter button and holds this state until the exposure is completed.

Accordingly, even in the case a picture is taken by using the self timer not shown in the drawing, when the shutter release button is depressed to start the self timer, the hold switch is brought into closed state, and the electronic shutter is assured the opportunity to be operative. The following operations are performed based on the construction described so far.

I. Shutter control operation for long exposure time:

In the case a long snapshot exposure or a time exposure exceeding one-eighth second, is to be made, the predetermined time, for example, 1 second indicated on the scale of the shutter time setting dial 3 is aligned with the fixed index mark I. In relation to the adjusting operation of the dial 3, the gears 5 and 6 are rotated, the sliding arm 7 installed on the back of the gear 6 short circuits the electrodes $C_3$ and $Co_1$. As the result, the resistors $R_1$, $R_2$ and $R_3$ are connected serieswise to the condenser C of the electronic shutter circuit shown in FIG. 5. The values of the resistors are selected in advance so that the product of the capacity C and the resistance $(R_1 + R_2 + R_3)$ is equal the set time, for example seven-eighths second, namely, 1 second minus the operating time of the mechanical members 121 and 101 in FIG. 4, for example one-eighth second. With the adjusting operation of the dial 3, since the sliding arm 2 makes contact with the electrode $Co_2$, the switch SM of FIG. 5 is closed and the shutter circuit 10 becomes ready for operation. With the adjustment of the dial 3, by the transmission chain CS wound around a pulley on the same shaft as the pulley 11, the shutter time is provided to the scale plate $Ss$ and the adjusted value can be read in the finder. The aperture value (stop value) which corresponds to the shutter time and which is adjusted by the wellknown meter mechanism based on numerical light value, is indicated in the finder by the pointer of the meter M$m$, and corresponding to this value the diaphragm preset ring of the lens is adjusted.

With the rotation of the gear 6 the lever 17 is swung by the cam 12 and, while the dial 3 is adjusted from high speed setting and to one-fourth second setting, the transmission chain 13 is tensioned against the force of the spring 18, and the rotating force of the dial 3 is transmitted to the pulley 16. Therefore, the pulley 16 displaces, by way of the cam 117, the cam 19 to a predetermined position where the interval between it and the pin 120 is the greatest and does not interlock with the operation of the dial 3 thereafter. The cam 11 is stopped at said position and held there. Next, when the shutter release button is depressed, the lever 201 is also depressed, and the retaining lever 203 releases the driver gear 206 by way of the lever 202 to raise the mirror QM. At the same time, the selector lever 208 is driven clockwise by the spring force of the contact piece 209a and thus the contact pieces 209a and 209b are closed. Accordingly, the hold switch SM shown in FIG. 5 is in ON state, a drive current flows through the magnet M to attract the nearby portion of the armature 125. When the drive gear 112 shown in FIG. 4 is released from stoppage by one end 206b of the drive lever 206, the control cam 116 is started by the force of the coil spring 111 by way of the gears 113 and 114 and, by way of the pin 118, rotates the cam 19 and releases cam 110. With the rotation of the release cam 110, the release lever 109 rotates clockwise and, to release the retention of the 1st screen lever 102, the 1st screen 103 of the shutter mechanism 100 starts running downward, the shutter opens, and the exposure is started. Since the switch So now opens, interlocking with the release lever 109, charging of the condenser C is started by way of the resistors $R_1$, $R_2$ and $R_3$.

After the lapse of seven-eighths second, the condenser C finishes charging, the shutter chip 10 which has a switching function is switched over, and the drive current to the magnet M is cut off. As the result, the anchor piece 124 is unlocked from the escape wheel 123, and the sector lever 121 is rotated counterclockwise by the force of the spring 111.

The sector lever, at position where one-eighth second has elapsed mechanically by the reducing gear which interlocks with the escape wheel, releases the retention of the second screen lever 119 by way of the pin 120. Thus the second screen 106 of the shutter is released and the exposure of the shutter is completed.

In other words, the exposure time becomes the predetermined 1 second by adding the timing value, one-eighth provided by second, by the mechanical governor to the time regulated by the electronic shutter. The above-mentioned magnet M is used to engage or disengage the anchor with or from the escape wheel which is the final stage of the reducing gears of the mechanical governor. Therefore a small magnet that requires a small current is sufficient for this purpose. And further, the engaging and disengaging operation itself is made by the speed reduction of the escape wheel and requires application of weak drive force, the operation of the magnet is made rapidly and no time delay during the transfer to the mechanical governor is produced. Therefore, a highly accurate time adjustment is possible. Especially for a long time exposure, since the current passing through the magnet M is small, the consumption of the power supply M$o$ is also small and the life of the power supply is extremely elongated.

II. Shutter medium and high speed exposure time adjusting operation:

In the case the shutter dial 3 is set at a predetermined time within the range M, for example, at 1/125 second, the swinging lever 17 swings in the direction to tension the transmission chain 13 by the cam 12, and drivingly couples the pulley 11 and pulley 16.

As a result, the position of the cam 19 is adjusted corresponding to the set position of the dial 3. During this while, since neither of the sliding arms 7 and 8 is in contact with the electrodes $C_1$–$C_5$, $Co_1$ and $Co_2$, the switch SM holds in the open state and only the exposure meter circuit of the circuit of FIG. 5 operates. As the result, by the release of the shutter, the shutter 100 runs continuously with the interval between the first and second screens regulated by the cam 19 to adjust the exposure time as in the well known shutter mechanism. When the dial 3 is set at a medium speed, especially at one-eighth second, although the switch SM is left open similar to the above-mentioned case, the sector arm 121 bears against the sector lever engaging pin 120 of the mechanical governor with the rotation of the cam 19 and the closing operation of the second screen is made.

Figure 7:
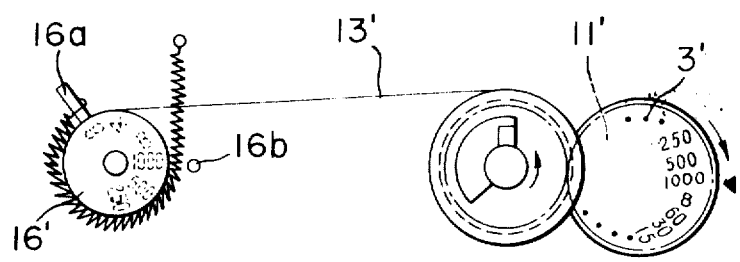
FIG. 7 through FIG. 9 respectively show modified embodiments of essential portions of the camera and device shown in FIG. 1.
Figure 8:
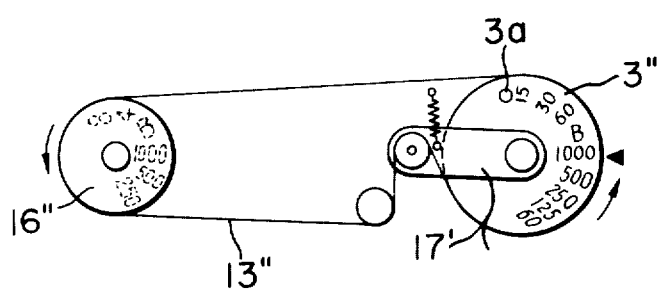
Figure 9:
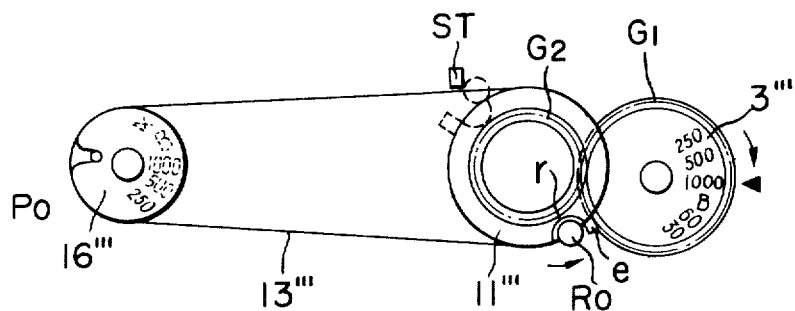

In the short exposure time case the sector lever 122 is shifted to the outside of the range of swing of the pin 120 by a mechanism not shown in the drawing, the operation of the pin 120 is not influenced by the sector lever. FIGS. 7–9 show modifications of the clutch mechanism shown in FIGS. 3A and 3B.

In FIG. 7 the shutter speed adjusting dial 3' engages with the pulley 11' and connected by the chain 13'. But the stopper 16a is provided on the pulley 16' (equivalent to the pulley 16) and, within the medium and high speed exposure time M, the stopper pin 16b hits the stopper 16a so that the pulley 16' is not interlocked.

In FIG. 8, the stopper pin 3a is planted on the dial 3' and, in the medium and high speed range M, the stopper pin 3a hits the arm 17' to release the tension of the chain 13'' and to release the interlocking with the pulley 16'' (equivalent to the pulley 16).

FIG. 9 shows another embodiment. In FIG. 9, 3''' is the shutter exposure time adjusting dial, $G_1$ is the drive gear fixed in one unit with the dial 3''' to the same shaft, $G_2$ is the driven gear which engages with the gear $G_1$, 11''' is the pulley fixed on the same shaft of the gear $G_2$ (which corresponds to the pulley 11 of FIG. 1), $r$ is a dented portion provided on the pulley 11''', $e$ is a protecting portion provided on the circumference edge of the pulley 11''', $Ro$ is roller which is provided on the transmitting chain 13''' and which fits the dent $r$, and 16''' is the pulley which corresponds to 16 of FIG. 1.

The both ends of the transmission chain 13''' are fastened to the pin $Po$ on the pulley 16'''. ST is the stopper which is provided on the circumference edge of the pulley 11'''. While adjusting the dial 3''' between 1/1000 second and ⅛ second, the pulley 11''' is rotated by way of the gears $G_1$ and $G_2$ and the transmission chain 13''' is driven by the fitting between the roller $Ro$ and the dent $r$ of the pulley 11''' to drive the pulley 16'''.

However, when the dial 3''' is adjusted to a time longer than one-fourth second of the low speed range, the roller $Ro$ hits the stopper ST and separates itself from the dent of the pulley 11''' and, by the adjustment of the dial 3''', only the pulley 11''' is driven and the pulley 16''' is not driven. Accordingly, in the low speed range, the pulley 16''' is held in standstill state.

As has been described so far, in this operation an accurate mechanical shutter is used in high and medium shutter speed adjustment and low speed shutter time adjustment is made by electronically timing the shutter by controlling the electromagnet which engages and disengages the final stage of the governor of the mechanical shutter and by adding to it the mechanical timing operation by means of the mechanical governor. This requires a small driving current and assures a highly accurate timing operation and, viewed from the point of construction, the whole mechanism allows to be formed to a small size. These features are significant advantages of the invention.

It is convenient to refer to the portion of the M/range in which the governor 121,122,123 controls the exposure time by retarding the movement of the cam 119 as the "medium exposure time range" and to refer to the remainder of the M/range, in which the governor is prevented (by the exposure time setting means) from affecting the cam 119, as the "short exposure time range." In these terms the E/range is the "long exposure time range." This terminology is more literally accurate than the corresponding common expressions regarding shutter "speed" which have been used in the foregoing specification in accordance with common usage.

We claim:

1. A shutter device for a camera, which comprises:
   a shutter mechanism having a shutter opening means and a shutter closing means arranged for operation in exposure time sequence after actuation of a shutter release means;
   exposure time setting means including a manual setting control and a mechanical displacement transmission system responsive thereto, said setting means being settable for exposure time in substantially contiguous short, medium and long exposure time ranges;
   a first mechanical exposure time control means arranged to be settable by said displacement transmission system and arranged to control fully the exposure time of said shutter mechanism in accordance with the position of said setting means when said setting means is set within said short exposure time range;
   a second mechanical exposure time control means arranged to be disabled by said setting means in said short exposure time range and to retard the operation of said first mechanical exposure time control means in said medium and long exposure time ranges and thereby to control the exposure time of said shutter mechanism in accordance with the position of said setting means in said medium exposure time range and to control the duration of a final portion of the exposure time of said shutter mechanism in said long exposure time range, said second mechanical exposure time control means including a control member for limiting the speed of movement of said first mechanical exposure control means and a rotary member the rotation of which is mechanically coupled to movement of said control member so as to provide a retarding action on movement of the latter and to reduce the force required to block said movement when said rotary member is blocked; and
   electronic exposure time control means arranged to be settable by said displacement transmission system and arranged to be electrically enabled only for settings of said setting means in said long exposure time range and also arranged to participate additively with said second mechanical exposure time control means to control exposure time of said shutter mechanism in said long exposure time range, said electronic control means including electromagnet means provided with a spring-biased armature structure arranged to blockingly engage said rotary member to block said control member of said second mechanical exposure time control means in its initial position for a time period controlled by said setting means which is less than the exposure time and thereafter to release said rotary member and thereby to release said second mechanical exposure time control means for a full operation thereof.

2. A shutter device as set forth in claim 16 in which a reduction gear train is provided to couple said rotary member to a pivoting movement of said control member of said second mechanical exposure time control means, in which clutch means are provided in said mechanical displacement transmission system for causing said second mechanical exposure time control means to be selectively set in said medium exposure time range and to be held at a single predetermined setting for all exposures in said low long exposure time range.

3. A shutter device as set forth in claim 2, in which said clutch means is constructed so that said clutch means is on when said setting means is set for any exposure time in said short and medium ranges and said clutch means is off when said setting means is set for any exposure time in said long time range.

4. A shutter device as set forth in claim 1, for a camera equipped with a finder mirror for through-the-lens viewing, in which said shutter mechanism includes means for raising said mirror prior to operation of said shutter opening means and in which the electronic timing means comprises:
   a power supply for operation;
   a timing circuit; and
   a switch means to be connected between the timing circuit and the power supply for operation, said switch means being turned on in response to operation of said mirror raising means to raise said mirror and turned off in response to return of the mirror to its lowered position.

5. A shutter device as set forth in claim 1, in which said exposure time control means includes:
   a variable resistance means and a capacitor connected to said resistance means and forming a time constant circuit therewith, the variable resistance means being connected to and controlled by said mechanical displacement transmission system, the resistance being variable thereby only within said long exposure time range.

6. A shutter device as set forth in claim 2, in which said manual setting control includes a setting dial, in which, further, said clutch means comprises: a cam element arranged to rotate while interlocking to said setting dial, a cam follower which is urged into sliding contact with the cam element, and a tension roller bearing on the cam follower; and in which said displacement transmission system comprises wires which, by way of the tension roller, operatively connects the dial with said respective exposure time control means.

7. A shutter device set forth in claim 2 in which said predetermined setting of said second mechanical exposure time control means provides an operating time for said second control means which exceeds the full operating time of said shutter opening means.

8. A shutter device as set forth in claim 2 in which the clutch means comprises:
   pulley means for rotating with said manual setting control for moving said displacement transmission means, the pulley means having an engaging portion and stopper means positioned adjacent to the pulley means;
   an engaging member engageably and disengageably arranged to be connected drivingly with said transmission means by way of the engaging portion of said pulley means;
   the stopper means of said pulley means being arranged so as to arrest said engaging member and thereby to disengage the latter from the pulley means when said setting means is set in the long exposure time range.

9. A shutter device as set forth in claim 2 in which the clutch means comprises:
   pulley means arranged to rotate with said manual setting control means, the pulley means having a protruding member, a spring-biased carrying means and a tension roller on the carrying means; and in which
   said displacement transmission means comprises a wire member which, by way of the tension roller, operatively connects the manual setting control means and the several exposure time control means.

10. A shutter device as set forth in claim 1 in which the electronic timing means comprises:
    a power supply for operation;
    a timing circuit; and
    a switch means to be connected between the timing circuit and the power supply for operation; and in which
    said manual setting control means of said exposure time setting means is so connected mechanically with the switch means that the switch means is turned off when the manual setting control means is set in the short exposure time range.

11. A shutter device for a camera comprising:
    a shutter mechanism having first and second shutter blades constituting a shutter assembly and having cocking means for shifting from an uncocked position to a cocked position;
    a first shutter blade driving means for moving the blade from the closed position to opened position in the course of the shutter release operation;
    a second shutter blade driving means for moving the second shutter blade from open position to closed position after the first shutter blade actuation;
    first latch means operably related to the first shutter blade driving means for latching the first blade driving means in the cocked position of the shutter assembly;
    second latch means operatively related to the second shutter driving means for latching the second shutter blade driving means in the cocked position of the shutter assembly;
    release control means rotatably arranged on the shutter assembly having a control cam means positioned engageably with the first latch means and the second latch means so as to release the first latch means and the second latch means sequentially when the control cam means is rotated;
    auxiliary timing means for mechanically timing, in cooperation with said release control means, at least part of the shutter opening duration for exposure times longer than those of a short exposure time range, said auxiliary timing means having a pivoted control member arranged to be driven by the cam means and a magnified movement member mechanically driven by said control member to magnify and retard its movement;
    an electronic timing means constituted so as to be effective in a long exposure time range ; and
    a shutter exposure time setting means mechanically connected by displacement transmission means to the electronic timing means and to the cam means and arranged to enable said auxiliary timing means at settings for exposure times longer than those of said short exposure time range;

the electronic timing means being provided with electromagnetic means having an actuating member engageable with said magnified movement member so as to initially latch the latter when the electronic timing means is effective, in such manner that whenever the shutter is set in the long exposure time range, a first part of the shutter opening duration is defined electronically by the electronic timing means and a second and last part of said duration is defined mechanically by the auxiliary timing means.

12. A shutter device for a camera as set forth in claim 11 in which, the actuating member of the electromagnetic means is engaged with the second latch means in order to arrest its release when the electromagnetic means is excited by the electronic timing means.

13. A shutter device for a camera set forth in claim 11, in which, said magnified movement member consists of an escape wheel and in which an anchor arm is provided to be moved thereby for further retardation of said control member.

* * * * *